(12) United States Patent
Walters

(10) Patent No.: US 8,630,940 B1
(45) Date of Patent: Jan. 14, 2014

(54) SYSTEM FOR INVESTING MONEY INTO AND REMOVING MONEY OUT OF A STOCK MARKET

(75) Inventor: Michael D. Walters, Ada, MI (US)

(73) Assignee: USA Financial Portformulas Corporation, Ada, MI (US)

( * ) Notice: Subject to any disclaimer, the term of this patent is extended or adjusted under 35 U.S.C. 154(b) by 0 days.

(21) Appl. No.: 13/248,873

(22) Filed: Sep. 29, 2011

Related U.S. Application Data

(60) Provisional application No. 61/387,552, filed on Sep. 29, 2010.

(51) Int. Cl.
*G06Q 40/00* (2012.01)
(52) U.S. Cl.
USPC .............................................. 705/37
(58) Field of Classification Search
CPC ..................................................... G06Q 40/00
USPC ......................................................... 705/37
See application file for complete search history.

(56) References Cited

U.S. PATENT DOCUMENTS

| | | | |
|---|---|---|---|
| 8,126,797 B2 * | 2/2012 | Jaffe | 705/36 R |
| 2009/0182684 A1 * | 7/2009 | Shalen | 705/36 R |
| 2009/0271332 A1 * | 10/2009 | Lo et al. | 705/36 R |

OTHER PUBLICATIONS

Elder-Rays Forex Technical Indicator, Oct. 16, 2006.*
Moody's Adversity Index, Moody's/MSNBC.com, www.rvbusiness.ocm, Apr. 8, 2009.*

* cited by examiner

*Primary Examiner* — Clifford Madamba
(74) *Attorney, Agent, or Firm* — Price Heneveld LLP

(57) ABSTRACT

A method of using at least one computer system to execute a financial transaction includes: obtaining, by a computer system, individual economic subcomponents score(s) related to a financial benchmark or genus of equity positions; obtaining, typically by a computer system, an overall zero-baseline score by summation of each of the individual economic scoring subcomponents; determining (typically using a computer system), based upon the overall zero-baseline score, whether or not to purchase or sell a financial stake in a financial position chosen from the group consisting of: an equity; a set of equity stocks; a money market; one or more mutual funds; one or more bond funds; and one or more securities or any combination thereof; and purchasing securities having an equity component when the overall zero-baseline score is positive or selling securities having an equity component when the overall zero-baseline score is negative.

21 Claims, 3 Drawing Sheets

SYSTEM FOR INVESTING MONEY INTO AND REMOVING MONEY OUT OF A STOCK MARKET

CROSS REFERENCE TO RELATED APPLICATION

This application claims priority to U.S. Provisional Patent Application Ser. No. 61/387,552, entitled SYSTEM FOR INVESTING MONEY INTO AND REMOVING MONEY OUT OF A STOCK MARKET, filed on Sep. 29, 2010, the disclosure of which is hereby incorporated by reference in its entirety.

FIELD OF THE INVENTION

The present invention generally relates to a system for investing money into and removing money out of the a stock (equity) market using a scoring system based upon a zero baseline as well as selected and weighted stock market and economic indicators.

BACKGROUND OF THE INVENTION

In the past, previous systems have been utilized by investors and their representatives to attempt to predict when to invest into the market and when to withdraw money out of the stock (equity) market to maximize the yield to the individual investor. However, these previously used systems did not translate easily to the individual investor since they were not based upon a zero baseline and did not take into account specific multiple different economic indicators and/or stock market indicators. Instead, previous systems would be based upon a single factor such as the Moody's risk analytics calculator or a comparison of the industry exponential moving averages (EMA), for example, a review of the 50-day EMA to the 125-day, 150-day, and the 175-day EMA. In the later example, if the system would remove 25% of funds from the market if the 50-day EMA was below the 125-day EMA and the same for the comparison for the other EMA's with all of the money out of the market for that month if all the EMA comparisons were below the 50-day EMA. These systems proved to be less sensitive to fluctuations in the market and not as effective in most all or all instances for effectively predicting equity market trends and investing money into and out of the equity/stock market for a variety of reasons.

SUMMARY OF THE INVENTION

An aspect of the present invention is generally directed to a method of using at least one computer system to execute a financial transaction. The steps of the method typically include: obtaining, by a computer system, individual economic subcomponents scores related to a financial benchmark or genus of equity positions; the individual economic subcomponents typically include at least the following: the Momentum Score; the Elder Ray Bull/Bear Score; the TRIX Indicator Score; and the MACD Score, where the computer system includes an input/output device, a processor operatively coupled to the input/output device, and a memory subsystem storing code responsive to the input from the user; obtaining, typically by a computer system, an overall zero-baseline score by summation of each of the individual economic scoring subcomponents; determining (typically using a computer system), based upon the overall zero-baseline score, whether or not to purchase or sell a financial stake in a financial position chosen from the group consisting of: an equity; a set of equity stocks; a money market; one or more mutual funds; one or more bond funds; and one or more securities or any combination thereof; and purchasing or selling the financial stake. The steps of purchasing the financial stake typically includes purchasing securities having an equity component when the overall zero-baseline score is positive and the steps of selling the financial stake includes selling securities having an equity component when the overall zero-baseline score is negative.

Yet another aspect of the present invention is generally directed toward a method for executing at least one financial transaction based upon a zero baseline scoring system whereby the investor maximizes the potential to experience the upside market gains, while reducing exposure to at least portions of the downside market losses by periodically moving money between an equity position and a security position where the security position is a security position that includes securities not having an equity component and mutual funds. The method typically includes the at least the following steps: obtaining economic data by using a user interfacing computer system comprising an input/output device, a processor coupled to the input/output device, and a memory subsystem storing code responsive to the input from the user where the user-interfacing computer is operably connected to at least one other computer system storing economic data via a network or operably connected to one or more data storage devices storing economic data; accessing individual economic data points of the economic data accessible using the economic data acquiring, user interfacing computer system where the individual economic data includes at least the following pieces of economic data: a financial index closing position for a time period, the 3 month moving average for the financial index, the 6 month moving average for the financial index, the Elder Ray Bear Power, the Elder Ray Bull Power, the 6-month momentum indicator, the TRIX 12-month indicator for the financial index, the 9 month Simple Moving average for the financial index, the moving average convergence divergence Exponential 12 month indicator and moving average convergence divergence exponential 26 month indicator, the 9-month exponential moving average, Moody's Risk of Recession indicator, the Chicago Board of Exchange volatility index high, the Chicago Board of Exchange volatility index low, the Chicago Board of Exchange Volatility Index open, and the Chicago Board of Exchange Volatility index close; inputting the individual economic data into an instruction generating computer system comprising an input/output device, a processor coupled to the input/output device, and a memory subsystem storing code responsive to the input from the user where the code outputs instructions based upon an algorithm that uses the individual economic data and yields a positive or negative score that correlates to an equity holding position when the score is positive or a money market or bond fund position when the score is negative; thereby transforming the individual economic data into instructions to buy or sell the equity holding position and to buy or sell a security position where the security position is chosen from the group consisting of: securities not having an equity component and mutual funds based upon the score; transmitting the instructions to an equity trader where the instruction are to purchase or sell; and transacting equities based upon the instructions from the computer system. The entire process is typically periodically (monthly, weekly, daily etc.) repeated to enhance the money returned on an investment of initial funds over time.

Another aspect of the present invention is generally directed to an article of manufacture including a non-transitory, tangible computer readable medium having stored thereon a plurality of instructions for a computer system to facilitate the purchase and sale of one or more equity assets or non-equity assets to maximize the potential to experience the upside market gains of an equity market while reducing exposure to at least a portion of the downside equity market that, in response to execution by at least one computer based system cause the computer-based system to perform operations that include the follow: obtaining, by the computer system, individual economic subcomponents scores related to a financial benchmark or genus of equity positions; where the individual economic subcomponents comprise at least the following: the Momentum Score; the Elder Ray Bull/Bear Score; the TRIX Indicator Score; and the MACD Score, where the computer system includes an input/output device, a processor operatively coupled to the input/output device, and a memory subsystem storing code responsive to the input from the user; obtaining, by the computer system, an overall zero-baseline score by summation of each of the individual economic scoring subcomponents; determining, based upon the overall zero-baseline score, whether or not to purchase or sell a financial stake in a financial position chosen from the group consisting of: an equity; a set of equity stocks; money market; mutual funds; bond funds; and one or more securities or any combination thereof; and purchasing or selling, by using the computer system, the financial stake where the steps of purchasing the financial stake includes purchasing securities having an equity component when the overall zero-baseline score is positive and the steps of selling the financial stake includes selling securities having an equity component when the overall zero-baseline score is negative.

These and other features, advantages and objects of the present invention will be further understood and appreciated by those skilled in the art by reference to the following specification, claims and appended drawings.

DETAILED DESCRIPTION OF PREFERRED EMBODIMENT

Figure 1:
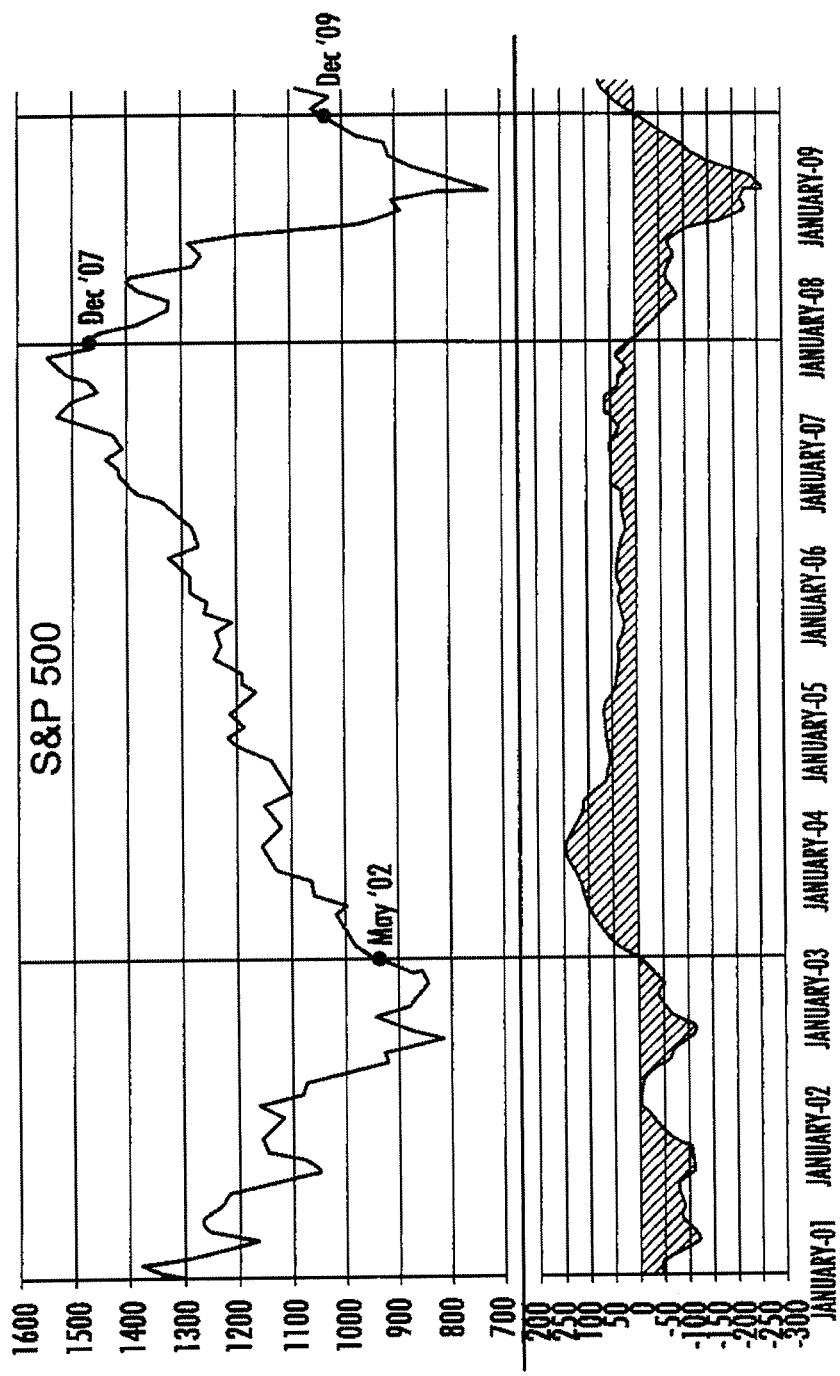
FIG. 1 is a graphical chart showing the correlation of the present inventions' scoring (bottom portion) to the corresponding time period in the S&P 500 equity market (upper portion). The graph shows the correlation between the negative and positive scores under an aspect of the present invention and the decreases and increases in the S&P 500 respectively.
Figure 2:
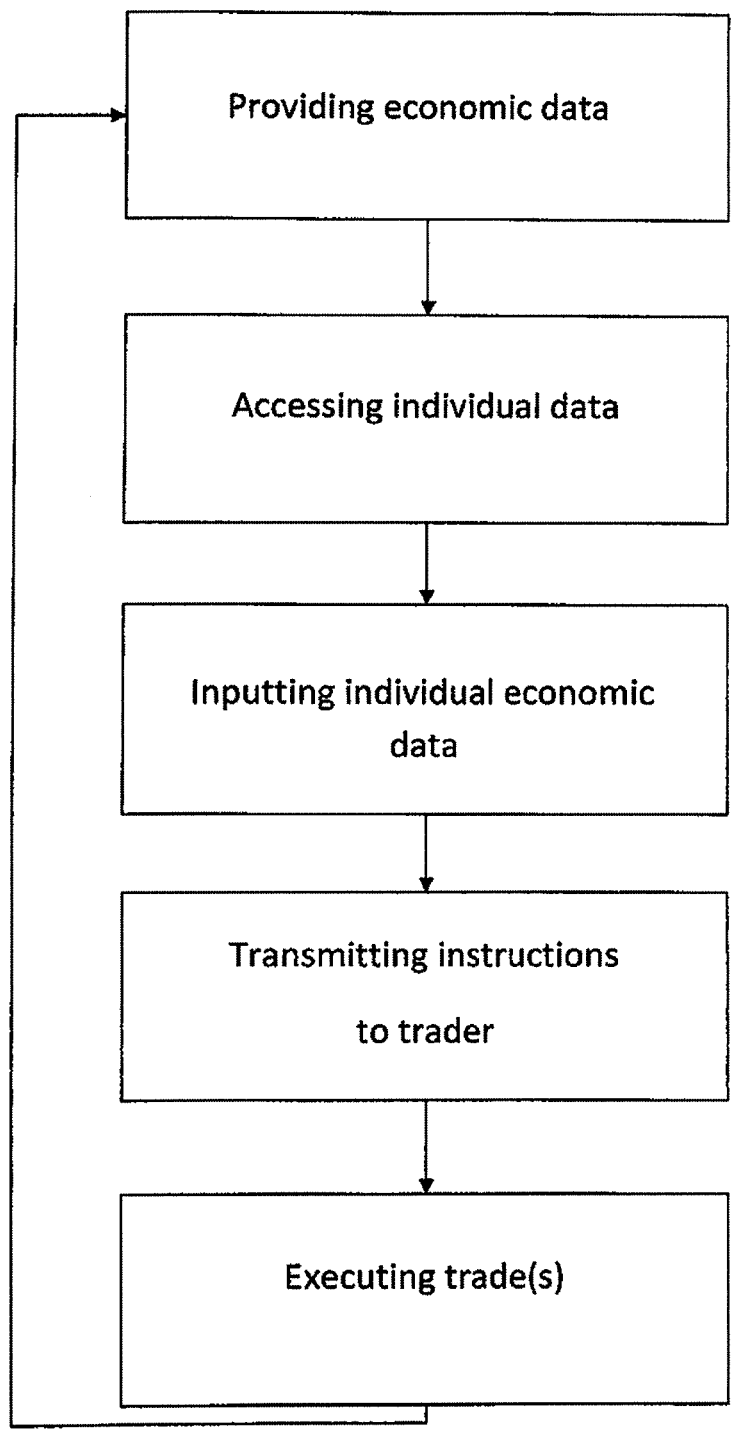
FIG. 2 is a flowchart illustrating aspects of methods, in accordance with the present invention.
Figure 3:
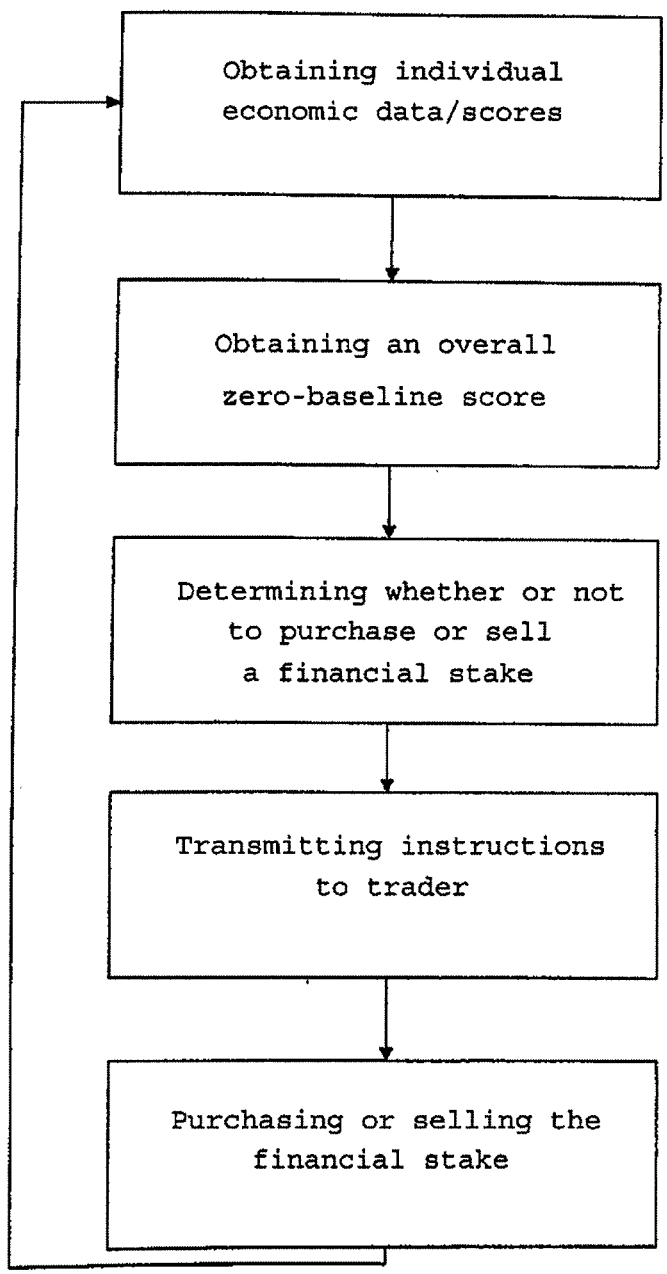
FIG. 3 is a flowchart illustrating aspects of methods in accordance with the present invention.

One or more embodiments of the present invention includes a scoring system based upon a zero baseline for determining when to invest monies into a stock (equity) market or out of a stock (equity) market and into a money market or bond/bond equivalent account/position. Applicants have surprisingly discovered that the selection of the factors discussed below, when weighted as discussed herein unless otherwise indicated, yield a zero baseline scoring system that provides a trend of when to invest money into and divest money out of a stock (equity) market on a periodic, typically monthly basis, for effectively increasing customer market yield while eliminating investors biases and emotion in the particular investments. For the most part, the examples shown in this application are tied to the Standard and Poor's 500 (S&P 500) index as the benchmark or as the genus of equity positions, which is a free-float capitalization-weighted index published since 1957 of the prices of 500 large-cap common stocks actively traded in the United States. Larger, publicly traded companies that are traded on the two largest stock exchanges in the United States, the New York Stock Exchange Euronext and the NASDAQ OMX, are generally included in the S&P 500. Standard & Poor's is a division of McGraw-Hill. While all new companies added to the S&P 500 are U.S. based companies, there are still some legacy companies with their headquarters in other countries.

A committee selects the components of the S&P 500. This is similar to the Dow 30, but different from others such as the Russell 1000, which are strictly rules-based. The committee selects companies for the S&P 500 to be representatives of various industries in the United States economy. In addition, companies that do not trade publicly and stocks that do not have sufficient liquidity are not in the index. The S&P 500, when discussed herein shall refer to the price return index unless otherwise noted herein. There are also "total return" and "net total return" versions of the index, which differ in how dividends are accounted. The price version does not account for dividends and only reflects the changes in the price of the components. Many investments provide performance tied to a particular index, such as the S&P 500, but investors cannot invest directly in that index.

Presently, the index is a float-weighted index. S&P 500 calculates the market caps relevant to the index using only the number of shares (the float) available for public trading.

While one or more embodiments of the present invention specifically contemplates a correlation to the S&P 500 and uses various factors that are tied to the S&P 500, Applicants presently believe that the present invention may be used in connection with any equity index and help an investor eliminate the human emotion from stock selection and capture the upswings and downswings within market fluctuations to obtain the best return on the investments.

In particular, one or more embodiments of the present invention calculates a zero baseline score based upon a few specifically selected factors that have been surprisingly found to effectively trend fluctuations in the marketplace. The zero baseline score provides an impetus to invest or not invest in the market, and it has been found that the trending allows the investor to maximize the potential to experience the upside market gains, while reducing exposure to portions of the downside market losses. Based upon whether this score is positive or negative (there is not presently believed to be a matter of degree relative to the score, i.e., a score of 80 does not mean that the market is 10 times more likely than if the score is 8 to go up, but rather simply that the predictor is to invest in the market) the assets/investments/money of the investor are allocated to (1) an equity market or (2) to a money market position, a bond (fund) ownership position, or a combination of a predetermined ratio of a money market position and bond (fund) ownership position. When invested into the equity market, Applicants' particular factors for which stocks to select in a given equity market may be utilized. This will be discussed in more detail below.

Specifically, the zero-baseline scoring system can utilize specifically selected and weighted factors, typically seven such factors. However, one singular factor or a plurality of factors discussed herein could be used. Fewer factors are more typically employed, when certain of the factors are inapplicable to the financial position being analyzed. The sum total of these factors (whether positive or negative) correspondingly indicates whether investment should be made into the stock (equity) market in the case of a positive score or out of the stock (equity) market in the case of a negative score. It should be appreciated that less than seven factors, additional factors, or alternative factors may be used and the factors may be calculated in any order.

The first factor can be the Monthly Exponential Moving Average Score. The Monthly Exponential Moving Average Score is the difference between the 3-month exponential moving average of the S&P 500 (a financial index) and the 6-month exponential moving average of the S&P 500 (a financial index). The resulting number is divided by the S&P 500 (a financial index) closing value for the time period, which is typically a month, and multiplied by 100.

The second factor (score) for the scoring system can include the Elder Ray Bull Power index for the financial index, in this example the S&P 500. The Elder Ray Bull Power index, which is a technical indicator developed by Alexander Elder that measures the amount of buying pressure in the market. The Bull Power is the daily high for the financial index (S&P 500) less the exponential moving average (EMA) for the financial index over the period of time (typically a month—the periods of time discussed in the scoring system are typically the same amount of time, in most cases a one month period). For the second factor, the 13-month (13 time period) Elder Ray Bull Power Index for the financial index (typically the S&P 500) divided by the monthly close for the financial index (typically the S&P 500). To this is added the 13-month Elder Ray Bear Power Index for the financial index (typically the S&P 500) divided by the monthly close for the financial index (typically the S&P 500) and calculated as a percentage (multiplied by 100). The result is the "Bull/Bear Score," which can be the second factor.

The third factor for the score can be the Momentum Score. The Momentum Score is the momentum indicator for the financial index (typically the S&P 500). The momentum indicator compares the current price of a security or index to the price a selected number of periods ago. The number represents the rate of change of the security or index's price over that given time period. It allows an analyst or investor to see where the current price stands in relation to historical trends and determines his/her strategy based on this analysis. The Momentum Score factor is the 6-month period momentum indicator for the financial index (typically the S&P 500) less one hundred.

The fourth factor for the final score can be the TRIX Indicator Score. The TRIX indicator score is the 12-month (time period) TRIX indicator for the financial index (typically the S&P 500) less the 9-month (period) Simple Moving Average of the monthly TRIX indicator for the financial index (typically the S&P 500) calculated as a percentage. The TRIX indicator is a momentum indicator that displays the percent rate-of-change of a triple exponentially smoothed moving average of a security or financial index's closing price. TRIX is designed to filter out stock movements that are insignificant to the larger trend of the stock. The user selects a number of periods (such as 10) with which to create the moving average and those cycles that are shorter than that period are filtered out. The TRIX indicator is a leading indicator that can be calculated in the following manner. First, calculate the exponential moving average of the closing price of the security or financial market index over a set time frame, for example 15 days. Second, calculate the exponential moving average of the moving average calculated in the first step. Third, calculate the exponential moving average of the moving average calculated in the second step to generate the triple exponentially smoothed moving averages of closing prices. Finally, the one-day percent change of the moving average calculated in the third step results in the TRIX indicator. A positive TRIX value is an indicator of steady rise in price while a negative is an indicator of steady decline.

The fifth factor can be the MACD Score. The MACD Score is applied against the moving average convergence divergence indicator of the financial index (typically the S&P 500). The moving average convergence divergence indicator is used to show the relationship between two moving averages of prices. The indices will be utilized to calculate the 12-month period (monthly) exponential moving average less the twenty-six period (monthly) exponential moving average divided by the monthly close of the financial index (typically the S&P 500). The resulting value is then less the nine period monthly exponential moving average divided by the monthly close of the financial index (typically the S&P 500), and multiplied by three-hundred to equal the MACD Score.

The sixth score can be the Risk of Recession factor (score). This factor is the Moody's Analytics Risk of Recession Indicator for the United States multiplied by negative one and then added to 36 one-hundredths (0.36) multiplied by 100 (i.e. calculated as a percentage). The Moody's Analytics Risk of Recession Indicator for the United States uses a coincident and leading index of economic activity for each state and major metropolitan area, translated into an index value for the probability of recession. The value is expressed in a percentage, and projects the likelihood of the U.S. or a regional economy falling into a recession within the next six months. The Leading Economic Indicator (LEI) is composed of six regional and three national indicators, modified to reflect regional impact. The indicators include housing permits, hours worked in manufacturing, initial unemployment insurance claims, the trade-weighted value of the dollar, the help-wanted index, consumer confidence, equity prices, the Treasury yield curve, and the Chicago Board of Exchange Volatility Index (VIX). These factors are combined into a percentage for the probability of recession.

The seventh score can be the Volatility Score, which is based upon the Chicago Board of Trade. This score is the average of the Chicago Board of Exchange Volatility Index high for the time period, typically a month, multiplied by the Chicago Board of Exchange Volatility Index low for the same time period. The average is then multiplied by −1, 19 is added and the difference between the Chicago Board of Exchange Volatility Index month open and the Chicago Board of Exchange Volatility Index month close is also added to yield the Volatility Score. The Chicago Board of Exchange Volatility Index is a weighted blend of prices for a range of options on the S&P 500 index. The formula used to generate the index is a kernel-smoothed estimator that takes as inputs the current market prices for all out of the money calls and puts for the first month and second month expirations. The objective is to provide an estimate of the implied volatility of the S&P 500 index over the next 30 day time period. The Chicago Board of Exchange Volatility Index (VIX) is the square root of the par variance swap rate for a 30-day term. Note that the VIX is the volatility of a variance swap and not that of a volatility swap (volatility being the square root of variance). A variance swap can be perfectly statistically replicated through vanilla puts and calls whereas a volatility swap requires dynamic hedging. The VIX is square root of the risk neutral expectation of S&P variance over the next 30 calendar days.

As discussed above, once the above seven scores are calculated, the total is summed to reach an overall score. If the total is positive, a user, which could be the investor or the investor's agent moves the investor's money into pre-selected stocks in a particular index, typically the S&P 500 index. When the number is negative, the user moves the money out of the equity market and into one or more money market account(s), a bond fund or bond holding, or a combination of money market account(s) and a bond fund or bond holding until the next periodic calculation. Typically, the total score is evaluated monthly, more typically at the first of every month or first trading day of every month.

Also, typically the total scoring system and process is conducted using software (e.g., one or more executable software routines) stored in the memory subsystem or device (for example, a computer readable media device such as a DVD, CD or USB drive) of a computer system that includes at least one input/output device, a processor coupled to the input/output device and the memory subsystem that stores the code. According to the process, a user retrieves the data for calculating the overall score using a computer system that may or may not be the same as the computer system that calculates the score. The computer system used to retrieve the data and/or used to generate the score is typically operably connected (or communicatively connected via a wire and/or wireless communication networks(s)) to a plurality of interconnected computer systems, such as one or more server(s) that store the data separately or as a database construct. A user accesses the data located remote from the computer system for retrieving the data for the scoring using the computer system for retrieving the economic data.

After the data is retrieved, a user inputs the data into the code using one or more input device. Additionally or alternatively, one or more executable software routines can be executed to input the retrieved data into the code. The output device then outputs the calculated total score of whether to invest into or divest from an equity holding position.

After the score has determined whether an investor should be investing into or divesting out of the equity market and a determination that investing into the equity market is made, investment is made into certain stocks. The stocks selected for investment are typically selected at each time the score determining whether to be investing in the market or divesting from the stock market is made and are selected.

Generally speaking, stocks can be selected in a user determined manner. The score can be used by a financial advisor or individual investor as an indicator of when to be (primarily or wholly) invested in securities and when to be (primarily or wholly) invested in non-equity markets. For example, an individual investor may use the zero-baseline score yielded using the systems of the present invention to adjust a retirement account, such as a 401k, holdings from select mutual funds to a majority or wholly equity position in a financial market and vice versa as well.

Preferably, however, the steps of selecting stock(s) according to an aspect of the present invention generally involves selecting stocks according to some basic and/or more specific criteria as discussed below. Generally speaking, the stock(s) selected according to an aspect of the present invention may be made according to eight basic sets of criteria. These general criteria are the following:

1) A Growth Model;
2) A Growth and Value Model;
3) A Value Model;
4) Blended Model No. 1;
5) Blended Model No. 2;
6) The S&P 500 Model;
7) The Non-S&P 500 Model; and
8) The International American Depository Receipts Model As used herein, a mega capitalization company is over about $200 billion; a large capitalization company is from about $10 to about $200 billion; a mid-capitalization company is from about $2 billion to about $10 billion; a small capitalization company is from about $300 million to about $2 billion; a micro capitalization company is from about $50 million to about $300 million; and a nano-capitalization company is below about $50 million.

Generally speaking, the Growth Model typically employs the following four general factors. First, four general criteria are reviewed in terms of market capitalization. One set of the criteria requires the company must be a U.S. based micro or small capitalization company. The second criteria require the company to be a U.S. based small capitalization company. The final two criteria look at the broad market in terms of capitalization. Second, the company must be tracked by numerous analysts and there must be positive upward revisions in earnings per share with zero downward revisions. Second, the company must be a United States based micro, small or mid-capitalization company. The price to sales ratio must be favorable and the relative strength must be strong. The earnings per share for this group must be positive. Lastly, the company's earnings per share must be positive and growing, the stock must be somewhere near its annual high, and the relative strength must be strong. There must be institutional investor representation as well.

Regarding the Growth and Value Model, this model generally includes the following factors. First, three general criteria are reviewed in terms of market capitalization. One set of the criteria requires the company must be a small capitalization company or larger company. The other two sets of criteria look at the broad market in terms of market capitalization. Operating income and return on equity must be strong, long term debt equity, operating margin, and net profit margin must all be strong in comparison to its industry, and the change in share price and price to free cash flow must be favorable. Second, the company's sales must be positive and growing, diluted earnings per share must be positive and growing, price earnings ratio must be strong but in check, and it must be United States based with positive relative strength, but not a financial services or real estate operation. Third, the company's price earnings ratio must be low in comparison with the earnings per share growth rate being managed. The percentage of common stock owned by institutions and the total liabilities to total assets must be in check. There can be no recent insider selling.

Regarding the Value Model, the Value Model typically encompasses the following factors. First, five general criteria are reviewed in terms of market capitalization. Two sets focus on market capitalization being significant in comparison to the stock market measured or the relevant index. The three other sets of criteria focus on the broad market. Second, the company's price earnings ratio must be favorable and the total liabilities to total assets must be favorable and earnings estimates from analysts must be increasing with zero downward estimates. The current dividend yield and earnings per share must be positive. Third, the company's price earnings ratio to dividends adjusted earnings per share estimated growth must be favorable, earnings per share and sales must be growing but in check, free cash flow must be positive and operating margin must be strong in comparison to its industry. Fourth, the company is not a utilities company and has sales over 400 million dollars, the current ratio, long term debt to working capital ratio, price earnings ratio and price to book ratio must all be favorable. Earnings per share growth must be positive and growing with dividends being paid.

The first Blended Model (Blended Model No. 1) generally includes a blend of factors from the Growth Model, the Growth and Value Model, and the Value Model. Specifically, the following factors typically included in Blended Model No. 1. First, four general criteria are reviewed in terms of market capitalization. Two sets of criteria focus on market capitalization that is significant in comparison to the market measured or relevant index. An additional set of criteria looks at the broad market, while the final criterion focuses on companies that are small capitalization companies or larger companies. Second, the company must be tracked by numerous analysts. There must be positive upward revisions in earnings per share with zero downward revisions for the company. Fourth, the company must be a mid or large capitalization company with strong operating income and return on equity. Long term debt to equity, operating margin and net profit margin must all be strong in comparison to its industry. The change in share price and price to free cash flow must be favorable. Fourth, the company's price earnings ratio must be favorable and the total liabilities to total assets must be favorable. The market capitalization must be significant in comparison to the market. The earnings estimates from analysts must be increasing with zero downward estimates. The current dividend yield and earnings per share must be positive.

The Blended Model No. 2 is also typically a blend of various factors from the Growth Model, the Growth and Value Model, and the Value Model. The typical factors included in the Blended Model No. 2 include the following. First, four general criteria are required in terms of market capitalization. One set of the criteria requires that the company must be a United States based micro-capitalization or small capitalization company. The second criterion requires the company be a United States based small capitalization company. The final two criteria look at the broad market. Second, the company must have a favorable price to sales ratio and the relative strength of the company must be strong. The earnings per share for the majority within this group must be positive. Third, the company's sales must be positive and growing, diluted earnings per share must be positive and growing, price earnings ratio must be strong but in check, and must be a United States based company with positive relative strength, but not a financial services or real estate operation. Fourth, the company's price earnings ratio to dividend adjusted earnings per share estimated growth must be favorable. The earnings per share and sales must be growing but in check. Free cash flow must be positive and operating margins must be strong in comparison to its industry.

The Standard and Poor's 500 Model is generally directed toward a company that is listed in the Standard and Poor's 500 and the company's Zacks Rank must be equal to one. Generally, the company's price earnings ratio and total liabilities to total assets must be favorable. The market capitalization must be significant in comparison to the market, and earnings estimates from analysts must be increasing with zero downward revisions. The Zack's Rank is a quantitative model that used trends and earnings estimate revisions and earnings per share surprises to classify stocks into five groups: #1=Strong Buy; #2=Buy; #3=Hold; #4=Sell; #5=Strong Sell. At all times, the Zacks Rank is proportionally applied to the approximately 4,400 stocks for which the sell side analyst estimates are available. Regardless of how the economy is fairing, only the very top 5% of stocks receive the coveted designation of Zacks #1 Rank and approximately only the same number of stocks are assigned Zacks #5 Rank. The majority of stocks are assigned as Zacks Rank #3.

The Zacks Rank is calculated from four primary inputs: Agreement, Magnitude, Upside, and Surprise.

Agreement is the extent to which all brokerage analysts are revising their earnings per share estimate in the same direction. The more analysts that are revising estimates upward, the higher the Zacks Rank. Magnitude is the size of recent changes in the consensus estimate for the current fiscal year and the next fiscal year. For example, an earnings estimate revision that causes the consensus estimate to increase by 10% is more significant than an earnings estimate revision that causes a 3% increase in the consensus estimate. The upside is the difference between the most accurate estimate and the consensus estimate. Surprise is when the earnings reported in a company's quarterly or annual report are above or below analyst earnings' estimates. A company that reports positive Surprise for the most recent quarter is more likely to have positive earnings Surprise in the next quarter as well (and vice versa). The Zacks Rank calculations factor in this last quarter's earnings per share Surprise. The Zacks Rank is recalculated every night based on these four factors. The four factors are combined into a composite score, which is then used to assign the Zacks Rank.

The Non-S&P 500 Model is essentially the same as the Standard and Poor's 500 Model but the companies must not be listed on the Standard and Poor's 500 index. The company's Zacks Rank must still be equal to one.

Finally, the International American Depository Receipts Model generally requires that the company's stock selected must be traded as an International American Depository Receipts with significantly large market capitalization and a Zacks Rank of one.

More specifically, each set of stocks from the set of the above eight selection criteria are typically selected in the manner discussed in more detail below. For all selection criteria, which stocks to invest in begins with an overall total stock universe that includes all stocks traded on the New York Stock Exchange, the American Stock Exchange, and The NASDAQ, excluding all OTC stocks. From that set, some initial criteria are used to eliminate stock as options for investing. Thereafter, the stock must also meet all of the criteria listed in one or more of the groups listed below for each model prior to being eligible for investment according to an embodiment of the present invention. As the initial criteria for all models, all companies whose stock price is less than $5 per share or greater than $400 per share are eliminated. Also initially eliminated are all companies whose stock does not maintain an average daily dollar volume over the last 3-month period of $5 million dollars or greater. This is the starting genus of stock to begin selecting stock to invest into based upon the additional eight sets of criteria below.

The Growth Model

From the starting genus of stocks, for this model, the particular stocks that will be invested into, based upon a positive score, must also meet all of the criteria from at least one of the following four groups of criteria (other bases for selecting particular stocks for investment can also be used):

Group 1:

A) The company's earnings per share growth from continuing operations for the last fiscal quarter must be 20% or greater than that of the same quarter one year prior;

B) The company's earnings per share from continued operations for the last two fiscal quarters must be positive;

C) The company's earnings per share from continued operations must have increased over the last twelve months and each of the last five fiscal years;

D) The company's growth in earnings per share from continuing operations over the last five years must be greater than or equal to 25%;

E) The company's current stock price must be within 20% of its 52 week high;

F) The company's stock float must be less than or equal to 30 million shares;

G) The company's 52 week relative strength must be within the top 30% of the stock market; and H) The company must have five or more institutional shareholders.

Group 2:

A) The company must be based in the United States and may not be an American Depository Receipt or ADR;

B) The company's market capitalization for the last fiscal quarter preferably must qualify the company as a micro-capitalization to small capitalization company, more preferably a company with a market capitalization for the last fiscal quarter of greater than or equal to $50 million and less than $500 million;

C) The company's price to sales ratio must be less than one; and

D) The company's stock must have a relative strength over the last 52 weeks within the top twenty percent of the stock market.

Group 3:

A) The company must be based in the United States and may not be an American Depository Receipt or ADR;

B) The company's market capitalization for the last fiscal quarter preferably must qualify the company as a small capitalization company. More preferably, the company's market capitalization for the last fiscal quarter must be greater than or equal to $500 million and less than or equal to $2 billion;

C) The company's price to sales ratio must be less than one and one-half;

D) The company's earnings per share growth for the last twelve months must be positive;

E) The company stock's relative strength over the last twenty-six weeks and thirteen weeks must be greater than the median relative strengths for the stock market over the same time frame; and F) The company's stock must have a relative strength over the last 52 weeks within the top ten percent of the stock market.

Group 4:

A) The company must have five or more analysts providing earnings estimates for the current fiscal year;

B) The company must have one or more upward revisions in the earnings per share estimate for the current fiscal year over the previous month;

C) The company must have zero downward revisions in the earnings per share estimate for the current fiscal year over the previous month;

D) The company must have one or more upward revisions in the earnings per share estimate for the next fiscal year over the previous month;

E) The company must have zero downward revisions in the earnings per share estimate for the next fiscal year over the previous month;

F) The company's latest earnings per share estimate for the current fiscal year must be increased greater than or equal to 5% compared to the previous month; and G) The company's latest earnings per share estimate for the next fiscal year must be increased greater than or equal to 5% compared to the previous month.

The remaining company stocks (from each of the four above criteria groupings) are selected. Should more than fifty stocks have met the criteria, the fifty ranked highest by relative strength over the last weeks 52 are selected and as tie-breakers, the last 26 weeks, then 13 weeks, then 4 weeks as necessary. Should less than 20 stocks have met the criteria, a prorated allocation toward cash is made (i.e., if only 16 stocks qualify, then 20% would be prorated to cash).

The Growth and Value Model

From the starting genus of stocks, for this model, the particular stocks that will be invested into, based upon a positive score, must also meet all of the criteria from at least one of the following three groups of criteria (other bases for selecting particular stocks for investment can also be used):

Group 1:

A) The company's market capitalization preferably must qualify the company as a small capitalization company. More preferably, the company's market capitalization must be greater than or equal to $1 billion dollars;

B) The company's operating income must be positive for the trailing twelve months;

C) The company's operating income must also be positive for each of the last seven fiscal years;

D) The company's return on equity must be greater than 15% for the trailing twelve months;

E) The company's return on equity must also be greater than 15% for each of the last three fiscal years;

F) The company's long term debt to equity for the most recent fiscal quarter must be less than the industry's median debt to equity for the same timeframe;

G) The company's operating margin for the trailing twelve months must be greater than the industry's median operating margin for the same timeframe;

H) The company's net profit margin for the trailing twelve months must be greater than the industry's median net profit margin for the same timeframe;

I) The company's change in share price must be greater than the change in retained earnings per share, or book value change over the last five fiscal years;

J) The company's price to free cash flow ratio divided by the free cash flow growth rate must be positive but less than or equal to two; and K) The company's price to free cash flow per share ratio for the trailing twelve months must be less than or equal to thirty.

Group 2:

A) The company's price earnings ratio must be less than the industry's median price earnings ratio;

B) The company's price earnings ratio must be less than the five year average price earning ratio;

C) The company's price earnings ratio must be less than the five year earnings per share growth rate including the five year dividend yield must be less than one;

D) The company's five year earnings per share growth rate from continuing operations must be less than 50 percent;

E) The company's percentage of common stock owned by institutions must be less than the median percentage of institutional ownership for the stock market;

F) The company's total liabilities to total assets for the last fiscal quarter must be less than the industry's median total liabilities to total assets for the same timeframe;

G) The company's insider buy trades for officers and directors during the last six months must be zero or more; and H) The company's insider sell trades for officers and directors during the last six months must be zero.

Group 3:

A) The company's diluted earnings per share from continued operations for the four most recent fiscal quarters must be greater than that of each of the same four fiscal quarters one year earlier;

B) The company's sales growth for the most recent fiscal quarter must be greater than that of the same quarter one year earlier;

C) The company's growth in sales from the most recent fiscal quarter to the same quarter one year earlier must be greater than that of the previous fiscal quarter to the same quarter one year earlier;

D) The company's diluted earnings per share for the trailing twelve months must be greater than or equal to that of the last fiscal year;

E) The company's diluted earnings per share the each of the last two fiscal years must be greater than that of the previous fiscal year;

F) The company's annualized growth rate in diluted earnings per share from continuing operations over the last three years must be greater than or equal to fifteen percent;

G) The company's annualized sales growth over the last three years must be greater than or equal to fifteen percent;

H) The company's diluted earnings per share from continued operations for the four most recent fiscal quarters must be greater than the growth in earnings between the sum total of the prior three fiscal quarters and the same three quarters one year ago—OR—the company's diluted earnings per share from continued operations for the four most recent fiscal quarters must be greater than or equal to thirty percent;

I) The company's diluted earnings per share from continued operations for the four most recent fiscal quarters must be greater than or equal to the annualized growth rate in diluted earnings per share from continuing operations over the last three years;

J) The company's price earnings ratio must be greater than five and less than one and one-half times the median price earnings ratio for the stock market;

K) The company stock's relative strength over the last twenty-six weeks must be positive;

L) The company must be based in the United States and may not be an American Depository Receipt or ADR;

M) The company's industry must not be identified as miscellaneous financial services or real estate operations; and N) The company stock's trading volume average for the last three months must be within the top seventy-five percent of the stock market.

The remaining company stocks (from each of the three criteria groupings) are selected. Should more than fifty stocks have met the three criteria, the fifty ranked highest by relative strength over the last 52 weeks are selected and as tiebreakers, the last 26 weeks, then 13 weeks, then 4 weeks as necessary. Should less than 20 stocks have met the criteria, a prorated allocation toward cash is made (i.e., if only 16 stocks qualify, then 20% would be prorated to cash).

The Value Model

From the starting genus of stocks, for this model, the particular stocks that will be invested into, based upon a positive score, must also meet all of the criteria from at least one of the following five groups of criteria (other bases for selecting particular stocks for investment can also be used):

Group 1:

A) The company's price earnings ratio must be less than or equal to the bottom forty percent of the stock market;

B) If the company is listed on the NYSE it must have market capitalization for the last fiscal quarter that is within the top thirty percent of the stock market;

C) If the company is listed on the AMEX or NASDAQ preferably it must have market capitalization for the last fiscal quarter that qualifies the company as a large capitalization company. More preferably, the company must have a market capitalization for the last fiscal quarter that is within the top fifteen percent of the stock market;

D) The company's total liabilities to total assets ratio for the last fiscal quarter must be less than or equal to the industry's median total liabilities to total assets ratio for the same timeframe;

E) The company must have four or more analysts providing earnings estimates for the current fiscal year;

F) The company's current earnings estimate for both the current fiscal year and the next fiscal year must be greater than it was one month ago;

G) The company must have at least one analyst that has increased the earnings estimate for the current fiscal year as well as at least one analyst who has increased the earnings estimate for the next fiscal year; and H) The company must have no downward revisions in the earnings estimates for either the current fiscal year or the next fiscal year.

Group 2:

A) The company's price earnings ratio must be less than or equal to the bottom forty percent of the stock market;

B) The company's market capitalization for the last fiscal quarter preferably must have a market capitalization that qualifies the company as a large capitalization. More preferably, the company market capitalization for the last fiscal quarter must be within the top thirty percent of the stock market;

C) The company's total liabilities to total assets ratio for the last fiscal quarter must be less than or equal to the sector's median total liabilities to total assets ratio for the same timeframe;

D) The company's current dividend yield must be greater than or equal to one and one-half percent;

E) The company's earnings per share growth rate for both the most recent twelve months and last fiscal year must be greater than or equal to the median stock market earnings per share growth rate for the same timeframes;

F) The company's estimated earnings per share for the current fiscal year must be greater than the reported earnings per share for the last fiscal year; and G) The company's estimated earnings per share for the next fiscal year must be greater than the estimated earnings for the current fiscal year.

Group 3:

A) The company is not considered a member of the utilities sector;

B) The company has sales over the last twelve months of $400 million or greater;

C) The company's current ratio for the last reported fiscal quarter must be greater than or equal to two;

D) The company's long-term debt to working capital ratio for the last fiscal quarter must be greater than or equal to 0% and less than or equal to 100%;

E) The company's earnings per share for the last twelve months and each of the last seven fiscal years must be positive;

F) The company's seven year earnings per share growth rate must be greater than 3%;

G) The company must have indicated its intentions to pay a dividend over the next year;

H) The company has paid a dividend over the last twelve months and each of the last seven fiscal years;

I) The company's price earnings ratio, using an average of earnings over the last three years, must be less than or equal to twenty-five; and J) The company's current price earnings ratio multiplied by the price to book ratio must be less than or equal to thirty-seven and one-half.

Group 4:

A) The company's price earnings ratio is among the lowest 10% of the stock market;

B) The company's current ratio for the last reported fiscal quarter is greater than or equal to one and one-half;

C) The company's long-term debt to working capital ratio for the last fiscal quarter must be greater than or equal to 0% and less than or equal to 110%;

D) The company's earnings per share for the last twelve months and each of the last five fiscal years must be positive;

E) The company must have indicated its intentions to pay a dividend over the next year;

F) The company has paid a dividend over the last twelve months;

G) The company's earnings per share over the last twelve months must be greater than the earnings per share from five years ago;

H) The company's earnings per share over the last fiscal year must be greater than the earnings per share from five years ago; and I) The company's price to book ratio must be less than or equal to one and two-tenths.

Group 5:

A) The company's price earnings ratio to the dividend adjusted earnings per share estimated growth most be less than or equal to one-half of the stock market median price earnings ratio to the dividend adjusted earnings per share estimated growth;

B) The company's earnings per share estimated growth must be greater than or equal to 7% and less than or equal to 20%;

C) The company's five year sales growth rate must be greater than or equal to 7% and less than or equal to 20%;

D) The company's free cash flow per share for the last twelve months and the last fiscal year must be positive;

E) The company's operating margin over the last twelve months must be greater than or equal to the industry's median operating margin over the same timeframe; and F) The company's operating margin over the last fiscal year must be greater than or equal to the industry's median operating margin over the same timeframe.

The remaining company stocks (from each of the above five criteria groupings) are selected. Should more than fifty stocks have met the criteria, the fifty ranked highest by relative strength over the last 52 weeks are selected and as tie-breakers, the last 26 weeks, then 13 weeks, then 4 weeks as necessary. Should less than 20 stocks have met the criteria, a prorated allocation toward cash is made (i.e., if only 16 stocks qualify, then 20% would be prorated to cash). On a monthly basis (on or about the first working week of the month) this step-by-step Portformula® criteria, including account rebalancing, is then reapplied on behalf of each investor. Investors may opt to change by notifying Portformulas® prior to the beginning of any new calendar month.

The Blended Model No. 1

From the starting genus of stocks, for this model, the particular stocks that will be invested into, based upon a positive score, must also meet all of the criteria from at least one of the following four groups of criteria (other bases for selecting particular stocks for investment can also be used):

Group 1:

A) The company's price earnings ratio to the dividend adjusted earnings per share estimated growth must be less than or equal to one-half of the stock market median price earnings ratio to the dividend adjusted earnings per share estimated growth;

B) The company's earnings per share estimated growth must be greater than or equal to 7% and less than or equal to 20%;

C) The company's five year sales growth rate must be greater than or equal to 7% and less than or equal to 20%;

D) The company's free cash flow per share for the last twelve months and the last fiscal year must be positive;

E) The company's operating margin over the last twelve months must be greater than or equal to the industry's median operating margin over the same timeframe; and F) The company's operating margin over the last fiscal year must be greater than or equal to the industry's median operating margin over the same timeframe.

Group 2:

A) The company's diluted earnings per share from continued operations for the four most recent fiscal quarters must be greater than that of each of the same four fiscal quarters one year earlier;

B) The company's sales growth for the most recent fiscal quarter must be greater than that of the same quarter one year earlier;

C) The company's growth in sales from the most recent fiscal quarter to the same quarter one year earlier must be greater than that of the previous fiscal quarter to the same quarter one year earlier;

D) The company's diluted earnings per share for the trailing twelve months must be greater than or equal to that of the last fiscal year;

E) The company's diluted earnings per share for each of the last two fiscal years must be greater than that of the previous fiscal year;

F) The company's annualized growth rate in diluted earnings per share from the continuing operations over the last three years must be greater than or equal to fifteen percent;

G) The company's annualized sales growth over the last three years must be greater than or equal to fifteen percent;

H) The company's diluted earnings per share from continued operations for the four most recent fiscal quarters must be greater than the growth in earnings between the sum total of the prior three fiscal quarters and the same three quarters one year ago—OR—the company's diluted earnings per share from continued operations for the four most recent fiscal quarters must be greater than or equal to thirty percent;

I) The company's diluted earnings over share from continued operations for the four most recent fiscal quarters must be greater than or equal to the annualized growth rate in diluted earnings per share from continuing operations over the last three years;

J) The company's price earnings ratio must be greater than five and less than one and one-half times the median price earnings ratio for the stock market;

K) The company stock's relative strength over the last twenty-six weeks must be positive;

L) The company must be based in the United States and may not be an American Depository Receipt or ADR;

M) The company's industry must not be identified as miscellaneous financial services or real estate operations; and N) The company stock's trading volume average for the last three months must be within the top seventy-five percent of the stock market.

Group 3:

A) The company must be based in the United States and may not be an American Depository Receipt or ADR;

B) The company's market capitalization for the last fiscal quarter preferably must qualify the company in the range of a micro-capitalized company to a small capitalization company. More preferably, the company's market capitalization for the last fiscal quarter must be greater than or equal to $50 million and less than $500 million;

C) The company's price to sales ratio must be less than one; and

D) The company's stock must have a relative strength over the last 52 weeks within the top twenty percent of the stock market.

Group 4:

A) The company must be based in the United States and may not be an American Depository Receipt ADR;

B) The company's market capitalization for the last fiscal quarter preferably must qualify the company as a small capitalization company. More preferably, the company's market capitalization for the last fiscal quarter must be greater than or equal to $500 million and less than or equal to $2 billion;

C) The company's price to sales ratio must be less than one and one-half;

D) The company's earnings per share growth for the last twelve months must be positive;

E) The company stock's relative strength over the last twenty-six weeks and thirteen weeks must be greater than the median relative strength for the stock market over the same timeframe; and F) The company's stock must have a relative strength over the last 52 weeks within the top ten percent of the stock market.

The remaining company stocks (from each of the above four criteria groupings) are selected. Should more than fifty stocks have met the criteria, the fifty ranked highest by relative strength over the last 52 weeks are selected and as tie-breakers, the last 26 weeks, then 13 weeks, then 4 weeks as necessary. Should less than 20 stocks have met the criteria, a prorated allocation toward cash is made (i.e., if only 16 stocks qualify, then 20% would be prorated to cash).

The Blended Model No. 2

From the starting genus of stocks, for this model, the particular stocks that will be invested into, based upon a positive score, must also meet all of the criteria from at least one of the following four groups of criteria (other bases for selecting particular stocks for investment can also be used):

Group 1:

A) The company's price earnings ratio must be less than or equal to the bottom forty percent of the stock market;

B) If the company is listed on the NYSE it preferably must have market capitalization for the last fiscal quarter that qualifies the company as a large capitalization company. More preferably, it must have market capitalization for the last fiscal quarter that is within the top thirty percent of the stock market;

C) If the company is listed on the AMEX or NASDAQ it must have the market capitalization for the last fiscal quarter that preferably qualifies the company as a large capitalization company. More preferably it must have a market capitalization for the last fiscal quarter that is within the top fifteen percent of the stock market;

D) The company's total liabilities to total assets ratio for the last fiscal quarter must be less than or equal to the industry's median total liabilities to total assets ratio for the same timeframe;

E) The company must have four or more analysts providing earnings estimates for the current fiscal year;

F) The company's current earnings estimate for both the current fiscal year and the next fiscal year must be greater than it was one month ago;

G) The company must have at least one analyst that has increased the earnings estimate for the current fiscal year as well as at least one analyst who has increased the earnings estimate for the next fiscal year; and H) The company must have no downward revisions in the earnings estimates for either the current or next fiscal year.

Group 2:

A) The company's price earnings ratio must be less than or equal to the bottom forty percent of the stock market;

B) The company's market capitalization for the last fiscal quarter preferably must qualify the company as a large capitalization company. More preferably, the company's market capitalization for the last fiscal quarter must be within the top thirty percent of the stock market;

C) The company's total liabilities to total assets ratio for the last fiscal quarter must be less than or equal to the sector's median total liabilities to total assets ratio for the same timeframe;

D) The company's current dividend yield must be greater than or equal to one and one-half percent;

E) The company's earnings per share growth rate for both the most recent twelve months and last fiscal year must be greater than or equal to the median stock market earnings per share growth rate for the same timeframe;

F) The company's estimated earnings per share for the current fiscal year must be greater than the reported earnings per share for the last fiscal year; and G) The company's estimated earnings per share for the next fiscal year must be greater than the estimated earnings for the current fiscal year.

Group 3:

A) The company must have five or more analysts providing earnings estimates for the current fiscal year;

B) The company must have one or more upward revisions in the earnings per share estimate for the current fiscal year over the previous month;

C) The company must have zero downward revisions in the earnings per share estimate for the current fiscal year over the previous month;

D) The company must have one or more upward revisions in the earnings per share estimate for the next fiscal year over the previous month;

E) The company must have zero downward revisions in the earnings per share estimate for the next fiscal year over the previous month;

F) The company's latest earnings per share estimate for the current fiscal year must be increased greater than or equal to 5% compared to the previous month; and G) The company's latest earnings per share estimate for the next fiscal year must be increased greater than or equal to 5% compared to the previous month.

Group 4:

A) The company's market capitalization preferably must qualify the company as a small capitalization company or larger company. More preferably, the company's market capitalization must be greater than about $300 million, more typically greater than or equal to one billion dollars;

B) The company's operating income must be positive for the trailing twelve months;

C) The company's operating income must be positive for each of the last seven fiscal years;

D) The company's return on equity must be greater than 15% for the trailing twelve months;

E) The company's return on equity must be greater than 15% for each of the last three fiscal years;

F) The company's long term debt to equity for the most recent fiscal quarter must be less than the industry's median debt to equity for the same timeframe;

G) The company's operating margin for the trailing twelve months must be greater than the industry's median operating margin for the same timeframe;

H) The company's net profit margin for the trailing twelve months must be greater than the industry's median net profit margin for the same timeframe;

I) The company's change in share price must be greater than the change in retained earnings per share, or book value change, over the last five fiscal years;

J) The company's price to free cash flow ratio divided by the free cash flow growth rate must be positive, but less than or equal to two; and K) The company's price to free cash flow per share ratio for the trailing twelve months must be less than or equal to thirty.

The S&P 500 Model

From the starting genus of stocks, for this model, the particular stocks that will be invested into, based upon a positive score, must also meet all of the criteria (other bases for selecting particular stocks for investment can also be used):

A) The company must be included and listed in the Standard & Poor's 500 index; and B) The company's Zacks Rank must equal one. This represents a quantitative model that used four factors related to earnings estimates. The four primary components used to determine the composite scores are; Agreement, which is the extent to which analysts have been revising their estimates in the same direction; Magnitude, which is the percentage change in the mean consensus estimate; Upside Potential, which is the extent to which the most accurate estimate deviates from the consensus estimate; and Surprise, which is the pattern of recent deviations of the reported quarterly earnings per share from the consensus estimates.

The remaining company stocks (from each of the above three criteria groupings) are selected. Should more than fifty stocks have met the criteria, the fifty ranked highest by relative strength over the last 52 weeks are selected and as tiebreakers, the last 26 weeks, then 13 weeks, then 4 weeks as necessary. Should less than 20 stocks have met the above criteria, a prorated allocation toward cash is made (i.e., if only 16 stocks qualify, then 20% would be prorated to cash).

The Non-S&P 500 Model

From the starting genus of stocks, for this model, the particular stocks that will be invested into, based upon a positive score, must also meet all of the criteria (other bases for selecting particular stocks for investment can also be used):

A) The company must NOT be included and listed in the Standard & Poor's 500 index;

B) The company's market capitalization must be greater than or equal to $10 billion dollars; and C) The company's Zacks Rank must equal one. This represents a quantitative model that used four factors related to earnings estimates. The four primary components used to determine the composite scores are; Agreement, which is the extent to which analysts have been revising their estimates in the same direction' Magnitude, which is the percentage change in the mean consensus estimate; Upside Potential, which is the extent to which the most accurate estimate deviates from the consensus estimate; and Surprise, which is the pattern of recent deviations of the reported quarterly earnings per share from the consensus estimates.

The remaining company stocks (from each of the three criteria groupings) are selected. Should more than fifty stocks have met the criteria, the fifty ranked highest by relative strength over the last 52 weeks are selected and as tiebreakers, the last 26 weeks, then 13 weeks, then 4 weeks as necessary. Should less than 20 stocks have met the criteria, a prorated allocation toward cash is made (i.e., if only 16 stocks qualify, then 20% would be prorated to cash).

The International American Depository Receipts Model

From the starting genus of stocks, for this model, the particular stocks that will be invested into, based upon a positive score, must also meet all of the criteria (other bases for selecting particular stocks for investment can also be used):

A) The company's stock must be traded as International American Depository Receipts;

B) The company's market capitalization must be greater than or equal to $5 billion dollars; and C) The company's Zacks Rank must equal one. This represents a quantitative model that used four factors related to earnings estimates. The four primary components used to determine the composite scores are; Agreement, which is the extent to which analysts have been revising their estimates in the same direction' Magnitude, which is the percentage change in the mean consensus estimate; Upside Potential, which is the extent to which the most accurate estimate deviates from the consensus estimate; and Surprise, which is the pattern of recent deviations of the reported quarterly earnings per share from the consensus estimates.

The remaining company stocks (from each of the three criteria groupings) are selected. Should more than fifty stocks have met the criteria, the fifty ranked highest by relative strength over the last 52 weeks are selected and as tiebreakers, the last 26 weeks, then 13 weeks, then 4 weeks as necessary. Should less than 20 stocks have met the criteria, a prorated allocation toward cash is made (i.e., if only 16 stocks qualify, then 20% would be prorated to cash).

Exchange Traded Fund Model

With respect to the exchange traded funds investment option for equities, the present invention begins with an overall Exchange Trade Fund (ETF) universe that typically includes at least the following 33 ETFs:

| Symbol: | Exchange Trade Fund: |
| --- | --- |
| EEM | iShares MSCI Emerging Markets Index Fund ETF |
| EFA | iShares MSCI EAFE Index Fund ETF |
| EPP | iShares MSCI Pacific ex-Japan Index Fund ETF |
| EWA | iShares MSCI Australia Index Fund ETF |
| EWC | iShares MSCI Canada Index Fund ETF |
| EWD | iShares MSCI Sweden Index Fund ETF |
| EWG | iShares MSCI Germany Index Fund ETF |
| EWH | iShares MSCI Hong Kong Index Fund ETF |
| EWI | iShares MSCI Italy Index Fund ETF |
| EWJ | iShares MSCI Japan Index Fund ETF |
| EWK | iShares MSCI Belgium Index Fund ETF |
| EWL | iShares MSCI Switzerland Index Fund ETF |
| EWM | iShares MSCI Malaysia Index Fund ETF |
| EWN | iShares MSCI Netherlands Index Fund ETF |
| EWO | iShares MSCI Austria Index Fund ETF |
| EWP | iShares MSCI Spain Index Fund ETF |
| EWQ | iShares MSCI France Index Fund ETF |
| EWS | iShares MSCI Singapore Index Fund ETF |
| EWT | iShares MSCI Taiwan Index Fund ETF |
| EWU | iShares MSCI United Kingdom Index Fund ETF |
| EWW | iShares MSCI Mexico Index Fund ETF |
| EWY | iShares MSCI South Korea Index Fund ETF |
| EWZ | iShares MSCI Brazil Index Fund ETF |
| EZA | iShares MSCI South Africa Index Fund ETF |
| EZU | iShares MSCI EMU Index Fund ETF |
| FXI | iShares FTSE/Xinhua China 25 Index Fund ETF |
| IEV | iShares MSCI Europe 350 Index Fund ETF |
| ILF | iShares MSCI Latin America 40 Index Fund ETF |
| 100 | iShares MSCI Global 100 Index Fund ETF |
| ITF | iShares MSCI S&P/TOPIX 150 Index Fund ETF |
| IWB | iShares MSCI Russell 1000 Index Fund ETF |
| IWM | iShares MSCI Russell 2000 Index Fund ETF |
| IWR | iShares MSCI Russell MidCap Index Fund ETF |

As mentioned herein, in addition to the zero-baseline scoring being used on a market index, a smaller number of factors, the factors that are not based upon an index indicator may be applied to yield a zero-baseline score that is applicable to a particular position/investment, in this case an Exchange Traded Fund. In this case, the factors considered include: the Bull Bear Score; the 6-month Momentum Score Factor; the TRIX Indicator; and the Moving Average Convergence Divergence Indicator. At least these factors applied to an individual fund are totaled to yield the composite zero-baseline score for the fund.

The individual scoring components described above are described in further detail next as applied to an analysis of an ETF. The elder ray index bull power and bear power measures the amount of buying and selling pressure in the market. As such, the corresponding ETF indices are utilized to calculate the thirteen period monthly elder ray, bull power index divided by the monthly close then added to the thirteen period monthly elder ray bear power index divided by the monthly close and multiplied by one hundred to equal the Bull Bear Score. The next scoring component relates to criteria applied against the momentum indicator for each ETF. The momentum indicator is used to measure trend strength and/or possible trend reversals. As such, the corresponding indices will be utilized to calculate the six period monthly momentum indicator less one hundred to equal the Momentum Score. The next scoring component relates to criteria applied against the TRIX indicator for each ETF. The TRIX indicator is used to identify oversold and overbought markets as it displays the rate of change of a triple exponentially smoothed moving average of closing price. As such, the corresponding indices will be utilized to calculate the twelve period monthly TRIX indicator less the nine period monthly simple moving average of the monthly TRIX indicator and multiplied by one hundred to equal the TRIX Score. The next scoring component relates to criteria applied against the moving average convergence divergence indicator for each ETF. The moving average convergence divergence indicator is used to show the relationship between two moving averages of prices. As such, the corresponding indices will be utilized to calculate the twelve period monthly exponential moving average less the twenty-six period monthly exponential moving average divided by the monthly close then subtracting the nine period monthly exponential moving average divided by the monthly close then multiplied by three hundred to equal the MACD Score. The overall score for each ETF is then calculated as the sum of the Moving Average Score plus Bull Bear Score plus Momentum Score plus TRIX Score plus MACD Score.

The top 5 ETFs based upon the overall ETF Score are selected. Should any of the top 5 ETF scores result in zero or a negative score, they will not be selected. Should less than 5 ETFs qualify with a positive score, a prorated allocation toward an institutional bond fund is used (i.e., if only 4 ETFs qualify, then 20% would be prorated to an institutional bond fund). On a monthly basis (on or about the first working week of the month) this step-by-step Portformula® criteria, including account rebalancing, is then reapplied on behalf of each investor. Investors may opt to change prior to the account rebalancing.

The ETFs are scored and ranked so that the top 5 ETFs are identified. The first scoring component relates to criterion applied against exponential moving averages for each ETF. The exponential moving averages provide more weight to the latest data so that they react quicker to recent price changes and simple moving averages and operate to smooth the data series increasing the amount of noise or extraneous movement. The strategy then calculates the three period monthly exponential moving average less the six period monthly exponential moving average then divided by the monthly close and multiplied by 100 to equal the Moving Average Score.

The scoring and stock investment evaluation is conducted on a periodic, typically monthly basis. Typically, the final step in the process is for stocks selected based upon the above criteria for a given time frame (one month) to be purchase at one or more stock exchanges by one or more investors. Instructions are typically communicated to the broker. Usually, the instructions to sell or buy certain equities according to the present invention are transmitted via a computer network of computer systems and/or servers that display the instructions to the broker or trader. After the instructions are sent to the broker or trader, the broker or trader may optionally input the results of the transactions including trades, into the computer system and the computer system, executing code (that can be stored on a computer readable media or in memory), can control one or more hardware components to transmit the information back to the investor or investors.

The actual algorithms for calculating the seven individual scores and the overall zero baseline score are the following:

The overall Total Score is the sum of the following seven factors:

1) The Monthly Moving Average Score=(((3 Month Moving Average–6 Month Moving Average)/SP 500 close for period)*100);

2) Elder Ray Bull/Bear Power Index Score=(((Elder Ray Bull Power/SP 500 close for period)+(Elder Ray Bear Power/SP 500 close for period))*100);

3) Momentum Score=(Momentum Period 6 month–100);

4) TRIX Indicator Score ((TRIX 12 Month–9 Month Simple Moving Average)*100);

5) MACD Score=(((MACD Exponential 12 Month Exponential 26 Month/SP 500 close for period)–(Exponential 9 Month Moving Average/SP 500 Close for period))*300);

6) Risk of Recession Score=(((Moody's Risk of Recession Indicator *–1)+0.36)*100); and 7) Volatility Score=((Average of the Chicago Board of Exchange Volatility Index high for the time period (month) and the Chicago Board of Exchange Volatility Index low for the time period (month))*–1)+19)+(Chicago Board of Exchange Volatility Index month open–Chicago Board of Exchange Volatility Index month close).

Example 1

By way of example 1, the data for Apr. 30, 2010, yields the following:

The Monthly Moving Average Score was 2.93. The three-month moving average was 1158.907 and the 6-month moving average was 1124.1 while the S&P 500 close for the period was 1186.69. The result of 1158.907 less 1124.1 is 34.807. 34.807 divided by 1186.69 is 0.02933, which when multiplied by 100 and rounded to one hundredth is 2.93.

The Elder Ray Bull Power Index Score was 18.96. The Elder Ray Bull Power was 137.2281 and the Elder Ray Bear Power was 88.11804. The Elder Ray Bull Power divided by the S&P 500 close for the period (1186.69) was 0.1156 and the Elder Ray Bear Power divided by the S&P 500 was 0.074. The sum of the Elder Ray Bear Power divided by the S&P close and the Elder Ray Bull Power divided by the S&P 500 close for the period is 0.1896, which multiplied by one hundred equals 18.96.

The Momentum Score for the period is the Momentum Period 6-month figure less one hundred. The momentum period 6-month figure for this month was 114.5244. 114.5244 less one hundred is 14.5244.

The TRIX Indicator Score for the period is the TRIX 12-Month data (–0.62783) less the 9-Month Simple Moving Average, which was –1.314538, multiplied by one hundred equals 68.67.

The MACD Score for the period is the MACD Exponential 12 Month Exponential 26 month number (−18.16357) divided by S&P 500 close (1186.69) is −0.0153. The Exponential 9-month moving average (−56.7079) divided by S&P 500 close (1186.69) is −0.04779. The difference between −0.0153 and −0.04779 is 0.03249. 0.03249 multiplied by 300 is 9.747.

The Risk of Recession Score for the period is the Moody's Risk of Recession Indicator, which was 0.26 for the month multiplied by −1 was −0.26. −0.26 plus 0.36 is 0.1, which multiplied by one hundred yields a Risk of Recession Score of 10.

The Volatility Score was −5.17 for the period. The average of the Chicago Board of Exchange Volatility Index high (23.03) and the Chicago Board of Exchange Volatility Index low (15.23) multiplied by −1 equals −19.13. −19.13 plus 19 is −0.13. The Chicago Board of Exchange Volatility index month open (17.01) less the Chicago Board of Exchange Volatility month close (22.05) was −5.04. The Final Volatility Score for the month was −5.17, which is the sum of −5.04 and −0.13.

As a result, the total final score for the month was 119.66. As a result, the present invention would transform that information into instructions to a broker/trader to move to an equity position for an investor and away from a money market and/or bond holding position in the marketplace.

Example 2

By way of example 2, the data for Nov. 30, 2008, yields the following:

The Monthly Moving Average Score was −11.96. The three-month moving average was 997.5193 and the 6-month moving average was 1104.7 while the S&P 500 close for the period was 896.24. The result of 997.5193 less 1104.7 is −107.1807. −107.1807 divided by 896.24 is −0.11958, which when multiplied by 100 and rounded to one hundredth is −11.96.

The Elder Ray Bull Power Index Score was 78.54. The Elder Ray Bull Power was −218.6974 and the Elder Ray Bear Power was −485.1874. The Elder Ray Bull Power divided by the S&P 500 close for the period (896.24) was −0.244 and the Elder Ray Bear Power divided by the S&P 500 was −0.541. The sum of the Elder Ray Bear Power divided by the S&P close and the Elder Ray Bull Power divided by the S&P 500 close for the period is −0.785, which multiplied by one hundred equals −78.5.

The Momentum Score for the period is the Momentum Period 6-month figure less one hundred. The momentum period 6-month figure for this month was 63.99977. 63.99977 less one hundred is −36.00023.

The TRIX Indicator Score for the period is the TRIX 12-Month data (−0.488806) less the 9-Month Simple Moving Average, which was 0.1174828, multiplied by one hundred equals −60.62888.

The MACD Score for the period is the MACD Exponential 12 Month Exponential 26 month number (−74.65747) divided by S&P 500 close (896.24) is −0.0833. The Exponential 9-month moving average (−13.10658) divided by S&P 500 close (896.24) is −0.0147. The difference between −0.0833 and −0.0147 is −0.0686. −0.0686 multiplied by 300 is −20.6.

The Risk of Recession Score for the period is the Moody's Risk of Recession Indicator, which was 0.58 for the month. 0.58 multiplied by −1 was −0.58. −0.58 plus 0.36 is −0.22, which multiplied by one hundred yields a Risk of Recession Score of −22.

The Volatility Score was −38.98 for the period. The average of the Chicago Board of Exchange Volatility Index high (81.48) and the Chicago Board of Exchange Volatility Index low (44.25) multiplied by −1 equals −62.865. −62.865 plus 19 is −43.865. The Chicago Board of Exchange Volatility index month open (60.17) less the Chicago Board of Exchange Volatility month close (55.28) was 4.89. The Final Volatility Score for the month was −38.98.

As a result, the total final score for the month was −268.46911. As a result, the present invention would transform that information into written or displayed instructions to a broker/trader to move to a money market and/or bond position and out of an equity position in the marketplace. It may also be used to generate and transmit instructions to a broker/trader's computer system. The transmission is typically made via the Internet, but could be telephonic, facsimile or other transmission medium.

In implementation of the present method and overall system, the typical initial step is for a person or persons, or computer system(s) to collect all of the individual data points and factual information for implementation of the scoring system of one or more embodiments of the present invention. One way one would typically gather the facts for implementation into the scoring system is by operating a computer system that includes an input/output device, a processor, and a memory subsystem operably connected to the processor and storing code. The computer system is also typically operably connected to the Internet, which is a computer network consisting of a worldwide network of computer networks that use the TCP/IP network protocols to facilitate data transmission and exchange. By doing so, the user can use the computer system or systems to retrieve the data necessary for calculating the seven scoring factors and thereby the overall zero-baseline score. Alternatively, the economic data could be read from one or more computer readable media such as data tapes, flash drives, DVDs, compact discs, and Blu-ray Discs, which is an optical disc storage medium designed for storing high-definition video and other data, with up to 25 GB per single-layered, and 50 GB per dual-layered disc. Although these numbers represent the standard storage for Blu-ray Disc drives, the specification is open-ended, with the upper theoretical storage limit left unclear. 200 GB discs are available, and 100 GB discs are readable without extra equipment or modified firmware. The Blu-ray discs have the same physical dimensions as standard DVDs and CDs and are optical and magneto-optical discs. Standard data storage media such as USB drives, memory cards, optical storage devices (e.g. CDs and DVDs) could also contain the data.

Significantly, the applicants are presently not aware of any one location on the Internet (or other computer system or computer network) or any other one data source where the data for use in connection with the present invention can be located. Also, a user of one or more embodiments of the present invention should first know what data to locate of the innumerable individual data available and also separately locate the information, which is typically done by accessing external web servers. Conceivably all the data for implementing one or more embodiments of the present invention could be located on a central database and that data could be pushed to another computer system for further transformation. In any case, the initial data must currently be collected individually or in small groups. This can often be very time intensive. Typically, a computer system is utilized to retrieve the information using code that retrieves and/or calculates the date and/or individual scores that make up the total composite zero-baseline score. Typically, at present at least two different computer codes are necessary to obtain all the data and/or to calculate all of the individual scores that make up the total composite zero-baseline score.

Once the data is collected, the data must be inputted into the computer system storing the algorithm of one or more embodiments of the present invention in code in the memory subsystem of a computer system. This computer system is typically the same computer system that is used to collect the individual data points from the Internet or other source, but could be a separate computer system located locally or remote from the computer system used to collect the individual score calculating data points.

Once entered into the computer system, typically based upon a user activated command or command sequence, the computer system calculates the individual scores from new data (if not previously calculated) and the total score for the time period (typically a month). That score is then typically transformed by the user and/or (typically automatically) by the computer system into instructions that are transmitted by the computer system and/or the individual to one or more traders and/or brokers who execute the instructions to move into a money market and/or bond position and out of an equity position or vice versa, based upon the score and optionally also transformed into a communication with one or a plurality of client(s)/investor(s) to inform them of the action that will be or has been taken regarding their investments. As discussed above, it may also be used to generate and transmit instructions to a broker/trader's computer system. The transmission is typically made via the Internet, but could be telephonic, facsimile or other transmission medium.

The above processes, as discussed herein, can be conducted at any time interval, but are presently conducted most typically at one-month intervals. This minimizes the costs associated with the practice of the present invention while potentially maximizing the performance of the investments by moving into and out of equity positions as most appropriate thereby potentially minimizing downside risks and maximizing the potential to capture any upswing in the equity market(s).

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A method of using at least one computer system to execute a financial transaction comprising the steps of:
   obtaining, by a computer system, individual economic subcomponent scores based upon economic data related to a stock market financial benchmark a genus stocks, or a particular investment; wherein the stock market financial benchmark, the genus of stocks or the particular investment have each of the following individual economic subcomponent scores a Momentum Score; an Elder Ray Bull/Bear Score; a TRIX Indicator Score; and a MACD Score; and
      wherein the computer system comprises an input/output device, a processor operatively coupled to the input/output device, and a memory subsystem storing code responsive to the input from a user;
      wherein the Momentum Score is the difference between the 3-month exponential moving average of the stock market financial benchmark, the genus of stocks or the particular investment and the 6-month exponential moving average of the stock market financial benchmark, the genus of stocks or the particular investment, which is divided by a closing value for a month for the stock market financial benchmark, the genus of stocks or the particular investment and thereafter multiplied by 100;
      wherein the Elder Ray Bull/Bear score is a 13-month Elder Ray Bull Power Index over an Elder Ray/Bull time period for the stock market financial benchmark, the genus of stocks or the particular investment divided by the closing value for the month and thereafter multiplied by 100;
      wherein the TRIX Indicator Score is a 12-month TRIX indicator for the stock market financial benchmark, the genus of stocks or the particular investment less a 9-month Simple Moving Average of a monthly TRIX indicator for the stock market financial benchmark, the genus of stocks or the particular investment multiplied by 100; and
      wherein the MACD Score is an exponential moving average value less a 9-month exponential moving average divided by the close of the stock market financial benchmark, the genus of stocks or the particular investment for a month and multiplied by 300, wherein the exponential moving average value is a 12 month exponential moving average of the stock market financial benchmark, the genus of stocks or the particular investment less a 26 month exponential moving average of the stock market financial benchmark, the genus of stocks or the particular investment divided by the close of the stock market financial benchmark, the genus of stocks or the particular investment for a month;
   obtaining an overall zero-baseline score by summation of the individual economic subcomponent scores;
   determining, based upon the overall zero-baseline score, whether or not to purchase or sell a financial stake in a stock, set of stocks or the particular investment; and
   purchasing or selling the financial stake in a stock, set of stocks, or the particular investment wherein the step of purchasing the financial stake includes purchasing the financial stake when the overall zero-baseline score is positive and the step of selling the financial stake includes selling the financial stake when the overall zero-baseline score is negative.

2. The method of claim 1 further comprising the step of transmitting instructions using a trading computer system to a broker or trader to purchase the financial stake in the stock, set of stocks, or the particular investment when the overall zero-baseline score is above zero or the step of transmitting instructions to sell the financial stake in the stock, set of stocks, or the particular investment when the overall zero-baseline score is below zero.

3. The method of claim 2, wherein the individual economic subcomponents scores consist of: a Monthly Moving Average Score; the Elder Ray Bull/Bear Score; the Momentum Score; the TRIX Indicator Score; the MACD Score; a Risk of Recession Score; and a Volatility Score;
   wherein the Monthly Moving Average Score is calculated as the difference between a 3-month exponential moving average of the stock market financial benchmarks, the genus of stocks or the particular investment and a 6-month exponential moving average of the stock market financial benchmarks, the genus of stocks or the particular investment divided by the closing value for a single month and multiplied by 100;

wherein the Risk of Recession Score is Moody's Analytics Risk of Recession Indicator for the United States multiplied by negative one and then added to 36 one-hundredths and then multiplied by 100; and wherein the Volatility Score is the average of the Chicago Board of Exchange Volatility Index high for a month multiplied by the Chicago Board of Exchange Volatility Index low for the month, then multiplied by negative one, then adding 19, then adding the difference between the Chicago Board of Exchange Volatility Index open for the month and the Chicago Board of Exchange Volatility Index close for the month.

4. The method of claim 1, wherein the individual economic scoring subcomponents scores further comprise the Monthly Moving Average Score; a Risk of Recession Score; and a Volatility Score;

wherein the Monthly Moving Average Score is calculated as the difference between a 3-month exponential moving average of the stock market financial benchmarks, the genus of stocks or the particular investment and a 6-month exponential moving average of the stock market financial benchmarks, the genus of stocks or the particular investment divided by the closing value for a single month and multiplied by 100;

wherein the Risk of Recession Score is Moody's Analytics Risk of Recession Indicator for the United States multiplied by negative one and then added to 36 one-hundredths and then multiplied by 100; and wherein the Volatility Score is the average of the Chicago Board of Exchange Volatility Index high for a month multiplied by the Chicago Board of Exchange Volatility Index low for the month, then multiplied by negative one, then adding 19, then adding the difference between the Chicago Board of Exchange Volatility Index open for the month and the Chicago Board of Exchange Volatility Index close for the month.

5. The method of claim 4, wherein the individual economic subcomponent scores relate to the stock market financial benchmark and the stock market financial benchmark is a stock index.

6. The method of claim 5 further comprising the step of obtaining, by the computer system, at least the following economic data: a financial index closing position for a time period, the 3-month moving average for the financial index, the 6-month moving average for the financial index, the Elder Ray Bear Power, the Elder Ray Bull Power, the 6-month momentum indicator, the TRIX 12-month indicator for the financial index, the 9-month Simple Moving Average for the financial index, the Moving Average Convergence Divergence Exponential 12-month indicator and Moving Average Convergence Divergence Exponential 26-month indicator, the 9-month Exponential Moving Average, Moody's Risk of Recession indicator, the Chicago Board of Exchange Volatility Index High, the Chicago Board of Exchange Volatility Index Low, the Chicago Board of Exchange Volatility Index Open; and the Chicago Board of Exchange Volatility Index Close, wherein the economic data is used to calculate the individual economic subcomponent scores.

7. The method of claim 1, wherein the computer system is operably connected to at least one other computer system via a computer network or operably connected to one or more data storage devices and the at least one other computer system or the one or more data storage devices comprises the economic data sufficient for the computer system to calculate the individual subcomponent scores and wherein the individual economic subcomponent scores consist of the Momentum Score, the Elder Ray Bull/Bear Score, the TRIX Indicator Score, the MACD Score and a Monthly Moving Average Score wherein the Monthly Moving Average Score is calculated as the difference between a 3-month exponential moving average of the stock market financial benchmarks, the genus of stocks or the particular investment and a 6-month exponential moving average of the stock market financial benchmarks, the genus of stocks or the particular investment divided by the closing value for a single month and multiplied by 100.

8. The method of claim 7, wherein the economic data comprises: a financial index closing position for a time period, the 3-month moving average for the financial index, the 6-month moving average for the financial index, the Elder Ray Bear Power, the Elder Ray Bull Power, the 6-month Momentum Indicator, the TRIX 12-month indicator for the financial index, the 9-month Simple Moving Average for the financial index, the Moving Average Convergence Divergence Exponential 12-month Indicator and Moving Average Convergence Divergence Exponential 26-month indicator, the 9-month Exponential Moving Average, Moody's Risk of Recession indicator, the Chicago Board of Exchange Volatility Index High, the Chicago Board of Exchange Volatility Index Low, the Chicago Board of Exchange Volatility Index Open; and the Chicago Board of Exchange Volatility Index Close, wherein the economic data is used to calculate the individual economic subcomponent scores.

9. The method of claim 8, wherein the economic data consists of: a financial index closing position for a time period, the 3-month moving average for the financial index, the 6-month moving average for the financial index, the Elder Ray Bear Power, the Elder Ray Bull Power, the 6-month momentum indicator, the TRIX 12-month indicator for the financial index, the 9-month Simple Moving Average for the financial index, the Moving Average Convergence Divergence Exponential 12-month indicator and Moving Average Convergence Divergence Exponential 26-month indicator, the 9-month Exponential Moving Average, Moody's Risk of Recession indicator, the Chicago Board of Exchange Volatility Index High, the Chicago Board of Exchange Volatility Index Low, the Chicago Board of Exchange Volatility Index Open; and the Chicago Board of Exchange Volatility Index Close, wherein the economic data is used to calculate the individual economic subcomponent scores.

10. The method of claim 1, wherein the financial stake is chosen from the group consisting of: a set of stock, one or more Exchanged Traded funds; one or more bond funds; and one or more money market funds.

11. The method of claim 1, wherein the step of obtaining a zero-baseline score by summation of the individual economic scoring subcomponents utilizes a computer system.

12. The method of claim 1, wherein the only basis for purchasing or selling the financial stake is the zero-baseline score.

13. The method of claim 12, wherein the step of purchasing or selling the financial stake based upon the transmitted instructions is automatically done when the overall zero-baseline score is above zero and selling the financial stake is done when the overall zero-baseline score is negative by a financial position adjusting computer system.

14. The method of claim 1, wherein the financial stake position is a financial stake in a set of stocks and the method further comprises the step of selecting the set of stocks, by a computer system, based upon predetermined criteria and the method is conducted on an at least substantially periodic basis.

15. The method of claim 1, wherein the individual economic subcomponent scores relate to a particular investment and the steps of purchasing or selling the financial stake is purchasing or selling the further comprises purchasing the particular investment when the zero-baseline score is below zero and selling the particular investment when the zero-baseline score is positive.

16. The method of claim 15, wherein the process is repeated at least about monthly.

17. The method of claim 15, wherein the step of transacting (1) the equity holding position or (2) the money market or bond position is conducted by a broker or trader using a broker/trader computer system.

18. The method of claim 15, wherein the particular investment is an Exchange Traded Fund.

19. A method for executing at least one financial transaction based upon a zero baseline scoring system where zero is between negative values below zero and positive values above zero whereby an investor increases the potential to experience upside market gains, while reducing exposure to at least portions of downside market losses by periodically moving money between an equity holding position where the equity holding position:
  inputting individual economic data into an instruction generating computer system comprising an input/output device, a processor coupled to the input/output device, and a memory subsystem storing code responsive to the input from a user wherein the code outputs instructions based upon an algorithm that uses the individual economic data and yields a positive score above zero or negative score below zero that correlates to the equity holding position when the score is positive or the money market or bond fund position when the score is negative; thereby transforming the individual economic data into instructions to buy or sell the equity holding position and to buy or sell the money market or bond fund position based upon the score;
  transmitting the instructions to a trader wherein the instruction are to purchase or sell (1) the equity holding position or (2) the money market or bond position; and
  transacting (1) the equity holding position or (2) the money market or bond position based upon the instructions from the computer system;
  wherein the entire process is periodically repeated to enhance the money returned on an investment of initial funds over time;
  wherein the algorithm is a summation of the following individual scores related to a stock market financial benchmarks: a Momentum Score; a Elder Ray Bull/Bear Score; a TRIX Indicator Score; and a MACD Score;
  wherein the Momentum Score is the difference between the 3-month exponential moving average of the stock market financial benchmark, the genus of stocks or the particular investment and the 6-month exponential moving average of the stock market financial benchmark, the genus of stocks or the particular investment, which is divided by the closing value for a month and multiplied by 100;
  wherein the Elder Ray Bull/Bear score is a 13-month Elder Ray Bull Power Index over an Elder Ray/Bull time period for the stock market financial benchmark, the genus of stocks or the particular investment divided by the closing value for the month for the stock market financial benchmark, the genus of stocks or the particular investment and thereafter multiplied by 100;
  wherein the TRIX Indicator Score is a 12-month TRIX indicator for the stock market financial benchmark, the genus of stocks or the particular investment less a 9-month Simple Moving Average of a monthly TRIX indicator for the stock market financial benchmark, the genus of stocks or the particular investment multiplied by 100; and
  wherein the MACD Score is an exponential moving average value less a 9-month exponential moving average divided by the close of the stock market financial benchmark, the genus of stocks or the particular investment for a month and multiplied by 300, wherein the exponential moving average value is a 12 month exponential moving average of the stock market financial benchmark, the genus of stocks or the particular investment less a 26 month exponential moving average of the stock market financial benchmark, the genus of stocks or the particular investment divided by the close of the stock market financial benchmark, the genus of stocks or the particular investment for a month.

20. An article of manufacture including a non-transitory, tangible computer readable medium having stored thereon a plurality of instructions for a computer system to facilitate the purchase and sale of one or more stocks or non-stock assets in response to execution by at least one computer based system cause the computer-based system to perform operations comprising:
  obtaining, by the computer system, individual economic subcomponents scores related to a financial benchmark; wherein the individual economic subcomponents comprise at least the following: a Momentum Score; a Elder Ray Bull/Bear Score; a TRIX Indicator Score; and a MACD Score, wherein the computer system comprises an input/output device, a processor operatively coupled to the input/output device, and a memory subsystem storing code responsive to the input from the user;
  obtaining, by the computer system, an overall zero-baseline score by summation of each of the individual economic scoring subcomponents;
  determining, based upon the overall zero-baseline score, whether or not to purchase or sell a financial stake in a financial position chosen from the group consisting of: a stock; a set of stocks; a money market; or more securities or any combination thereof;
  purchasing or selling, by using the computer system, the financial stake wherein the step of purchasing the financial stake includes purchasing a stock or set of stocks when the overall zero-baseline score is positive and the step of selling the financial stake includes selling a stock or set of stocks when the overall zero-baseline score is negative;
  wherein the Momentum Score is the difference between the 3-month exponential moving average of the stock market financial benchmark, the genus of stocks or the particular investment and the 6-month exponential moving average of the stock market financial benchmark, the genus of stocks or the particular investment, which is divided by the closing value for a month and multiplied by 100;
  wherein the Elder Ray Bull/Bear score is a 13-month Elder Ray Bull Power Index over an Elder Ray/Bull time period for the stock market financial benchmark, the genus of stocks or the particular investment divided by the closing value for the month for the stock market financial benchmark, the genus of stocks or the particular investment and thereafter multiplied by 100;
  wherein the TRIX Indicator Score is a 12-month TRIX indicator for the stock market financial benchmark, the genus of stocks or the particular investment less a 9-month Simple Moving Average of a monthly TRIX indicator for the stock market financial benchmark, the genus of stocks or the particular investment multiplied by 100; and wherein the MACD Score is an exponential moving average value less a 9-month exponential moving average divided by the close of the stock market financial benchmark, the genus of stocks or the particular investment for a month and multiplied by 300, wherein the exponential moving average value is a 12 month exponential moving average of the stock market financial benchmark, the genus of stocks or the particular investment less a 26 month exponential moving average of the stock market financial benchmark, the genus of stocks or the particular investment divided by the close of the stock market financial benchmark, the genus of stocks or the particular investment for a month.

21. The article of manufacture of claim 20, wherein the operations further comprise transmitting instructions using a trading computer system, by the computer system, to a broker or trader to purchase the financial stake in the stock or set of stocks when the overall zero-baseline score is positive or the step of transmitting instructions to sell the financial stake in the stock or set of stocks when the overall zero-baseline score is negative.

* * * * *

UNITED STATES PATENT AND TRADEMARK OFFICE
CERTIFICATE OF CORRECTION

PATENT NO. : 8,630,940 B1
APPLICATION NO. : 13/248873
DATED : January 14, 2014
INVENTOR(S) : Walters It is certified that error appears in the above-identified patent and that said Letters Patent is hereby corrected as shown below:

In the Specification

Column 1, line 18, delete "the" after --of--;
Column 1, line 37, "later" should be --latter--;
Column 2, line 5, "includes" should be --include--;
Column 2, line 7, "includes" should be --include--;
Column 2, line 12, "zero baseline" should be --zero-baseline--;
Column 2, line 19, delete "the" after --includes--;
Column 2, line 59, "instruction" should be --instructions--;
Column 3, line 29, "includes" should be --include--;
Column 3, line 39, "inventions" should be --invention's--;
Column 3, line 57, "Applicants have" should be --Applicant has--;
Column 3, line 64, "investors" should be --investor's--;
Column 4, line 32, "Applicants presently believe" should be --Applicant presently believes--;
Column 4, line 55, "Applicants" should be --Applicant's--;
Column 7, line 19, "network(s))" should be --network(s)--;
Column 7, line 65, "$10" should be --$10 billion--;
Column 10, line 7, "earnings'" should --earnings--;
Column 10, line 41, delete "dollars" after --million--;
Column 12, line 8, delete "dollars" after --billion--;
Column 13, line 4, "the" should be --for--;
Column 15, line 21, "most" should be --must--;
Column 19, line 19, "are;" should be --are:--;
Column 19, line 43, delete "dollars" after --billion--;
Column 19, line 47, "are;" should be --are:--;
Column 19, line 49, "direction" should be --direction;--;
Column 20, line 4, delete "dollars" after --billion--;
Column 20, line 8, "are;" should be --are:--;
Column 20, line 10, "direction" should be --direction;--;

Signed and Sealed this
Sixteenth Day of September, 2014

Michelle K. Lee
*Deputy Director of the United States Patent and Trademark Office*

CERTIFICATE OF CORRECTION (continued)

U.S. Pat. No. 8,630,940 B1

Column 21, line 8, "elder ray index bull power and bear power" should be --Elder Ray Index Bull Power and Bear Power--;
Column 21, line 11, "elder ray, bull power index" should be --Elder Ray, Bull Power Index--;
Column 21, line 13, "elder ray bear power index" should be --Elder Ray Bear Power Index--;
Column 22, line 2, "purchase" should be --purchased--;
Column 24, line 49, "applicants are" should be --Applicant is--;
Column 24, line 64, "date" should be --data--;

In the Claims

Column 25, claim 1, line 53, "benchmark a genus stocks" should be --benchmark, a genus of stocks--;
Column 25, claim 1, line 57, "scores a" should be --scores: a--;
Column 26, claim 1, lines 26-27, "12 month" should be --12-month--;
Column 26, claim 1, line 29, "26 month" should be --26-month--;
Column 26, claim 3, line 56, "subcomponents" should be --subcomponent--;
Column 27, claim 4, line 14, "subcomponents" should be --subcomponent--;
Column 28, claim 10, line 46, "Exchanged" should be --Exchange--;
Column 29, claim 15, lines 1-2, delete "is purchasing or selling the";
Column 29, claim 19, line 15, "zero baseline" should be --zero-baseline--;
Column 29, claim 19, line 21, after "holding position" insert --is an investment in a stock or set of stocks and a money market or bond fund position--;
Column 29, claim 19, lines 36-37, "instruction" should be --instructions--;
Column 29, claim 19, line 47, "a Elder" should be --an Elder--;
Column 29, claim 19, line 57, "score" should be --Score--;
Column 30, claim 19, lines 10-11, "12 month" should be --12-month--;
Column 30, claim 19, line 13, "26 month" should be --26-month--;
Column 30, claim 20, lines 23-24, "computer based" should be --and computer-based--;
Column 30, claim 20, line 27, "subcomponents" should be --subcomponent--;
Column 30, claim 20, line 29, "a Elder" should be --an Elder--;
Column 30, claim 20, lines 41-42, after "or" delete "more securities or";
Column 30, claim 20, line 58, "score" should be --Score--;
Column 31, claim 20, lines 11-12, "12 month" should be --12-month--; and
Column 31, claim 20, line 14, "26 month" should be --26-month--.